United States Patent Office 3,689,350
Patented Sept. 5, 1972

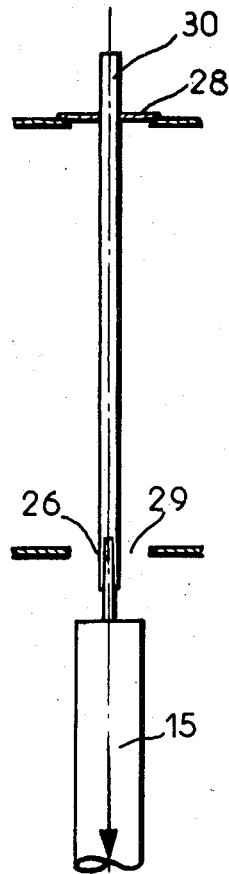
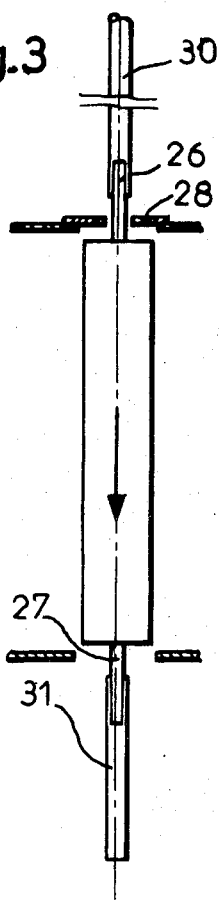
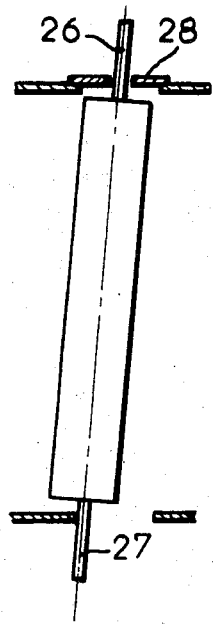
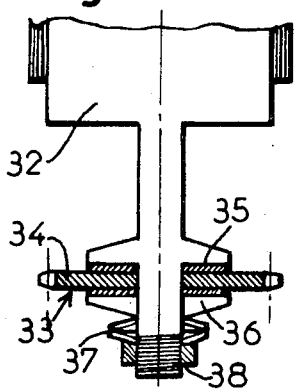
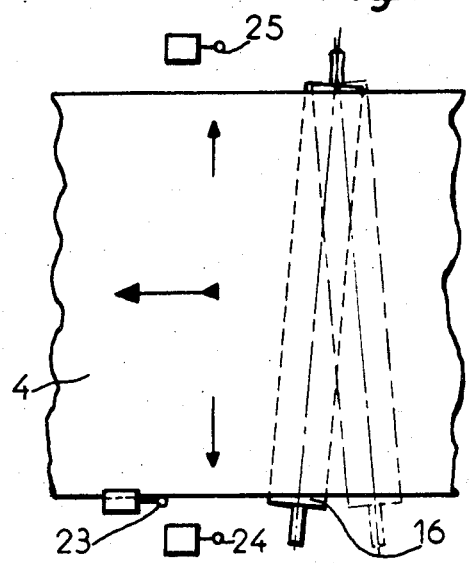

3,689,350
APPARATUS FOR THE HEAT TREATMENT OF SHEET AND FIBROUS MATERIAL
Henry Renaut, 40 Rue Boucherde Perthes, 59 Roubaix, France
Continuation-in-part of application Ser. No. 813,833, Apr. 7, 1969. This application May 25, 1970, Ser. No. 40,099
Claims priority, application France, Dec. 9, 1968, 177,248
Int. Cl. B32b 31/08, 31/20
U.S. Cl. 156—540      6 Claims

ABSTRACT OF THE DISCLOSURE

An apparatus for the heat treatment of sheet and fibrous material, in particular for carrying out a thermo-impression process, comprising a rotatable drum heated to a predetermined temperature against which the materials to be heated are applied by an endless belt whose linear velocity is equal to the angular velocity at the surface of the drum. The endless belt encompasses the major portion of the drum.

This application is a continuation-in-part of my co-pending application, Ser. No. 813,833, filed Apr. 7, 1969, now abandoned.

BACKGROUND OF THE INVENTION

The present invention relates to apparatus generally known as a "calender" for the heat treatment of material such as, sheet and fibrous material having very little thickness and, more particularly, but not exclusively, to apparatus for carrying out the process commonly called the thermo-impression of fibres. This process consists of exposing a paper which has been previously impregnated with colouring, chosen for example, among those colourings called "dispersed" or "plasto-soluble" to a suitable temperature, in the order of 120° C., for a given time, in relation to the intensity of the shade to be obtained, for example, a half to two minutes, in such a way that the colouring, by evaporation or sublimation is fixed to the material, for example, fabric to be tinted.

One such process is described in French Pat. Nos. 1,223,330 and 1,334,829. This dry tinting process by sublimation of the colouring matter previously impressed on a provisional inert support is thus a known process the carrying out of which necessitates, however, a very sensitive and accurate apparatus for controlling the temperature obtained and, controlling the exposure time.

These criteria are more exacting than for other known processes in this field, such as: heat adhesion of several cloths, counter-adhesion of two products of different nature such as a cloth and a lining of plastic foam material, heat-application to hosiery articles with a view to their attachment in sizes, etc. Consequently, the apparatus of the present invention can be used to carry out these processes.

In known apparatus the heating effect has been obtained by passing products between a revolving drum or calender and a fixed plate made as a segment of a cylinder enveloping the calender.

With this known apparatus, only half of the drum is used and accordingly the process can only be effected at a slow speed in order to obtain the necessary exposure time.

Rigid shapes are also very difficult to apply to the drum and, as a result, there is frequent evidence of the treated products being crushed, to a varying degree, in relation to the thickness of the said treated product.

For the revolving drum, to displace the product on to a fixed plate, it must overcome a very strong adhesive force and requires for this, a powerful motor.

This adhesive force also creates a relative displacement of the paper and of the product thus marring the final result.

Furthermore, the known method of heating the calender does not enable a uniform temperature to be obtained on the calender.

OBJECTS OF THE PRESENT INVENTION

An object of the present invention is to minimise all the above-mentioned drawbacks by means of an improved apparatus for the heat treatment of sheet and fibrous material comprising a rotatable cylindrical drum heatable to a predetermined temperature and means for rotating the drum, which is characterised by an endless belt for applying the material to be heat treated to the cylindrical surface of the drum, said belt having a linear velocity which is substantially equal to the angular velocity of the cylindrical surface of the drum, the belt encompassing the major part of the drum.

Other objects of the invention will become apparent from the following description relating to one embodiment of the invention, given by way of example only, with reference to the figures of the accompanying drawings in which:

DESCRIPTION OF DRAWINGS

FIGS. 2, 3 and 4 are details of the apparatus of FIG. 1 showing guiding rollers for an endless belt and their means of mounting;

FIG. 5 is a detail of a centering device for the endless belt;

FIG. 6 is a detail of a braking device for the winding and/or unwinding of the bands of material to be processed by the apparatus of FIG. 1.

DESCRIPTION OF A PREFERRED EMBODIMENT

Figure 1:
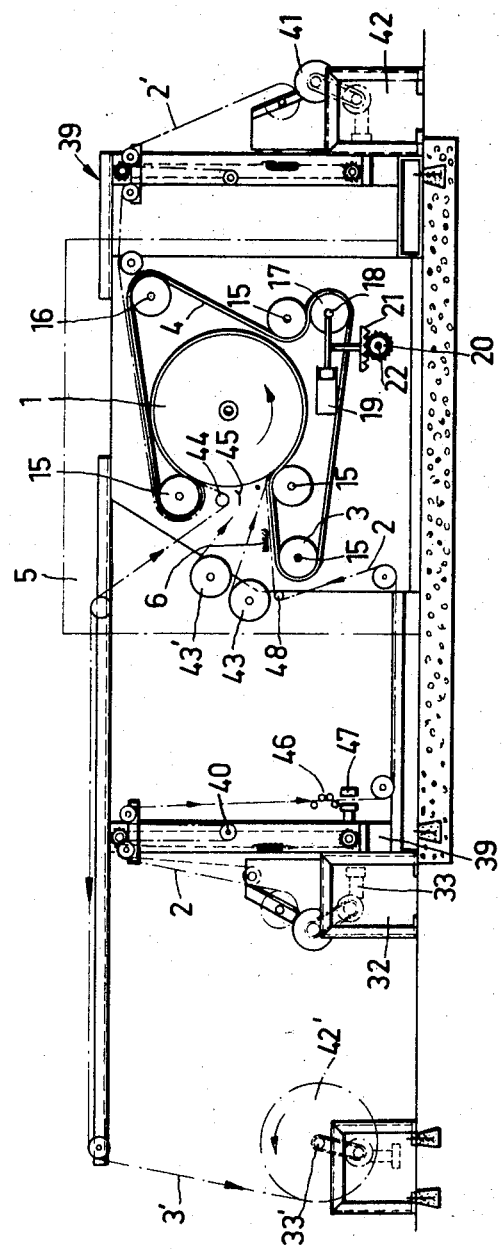
FIG. 1 is a diagrammatic side view of an apparatus for the heat treatment of sheet and fibrous products.

As shown, an apparatus for the heat treatment of sheet and fibrous products, for example, a thermo-impression process in which paper carrying a design and fabric on which the design is to be transposed comprises a cylindrical heating drum 1 on which the fabric 2 and the special paper 3 are applied by an endless belt 4.

The drum 1 can be heated by different means such as steam, an oil bath, electrical resistance, thermic fluid, gas, etc.

The drum 1 can be placed in an oven or in a heated chamber 5. Alternatively, or as a supplement to the chamber 5 a preheating device 6 can be coupled or the cloth heated.

Figure 7:
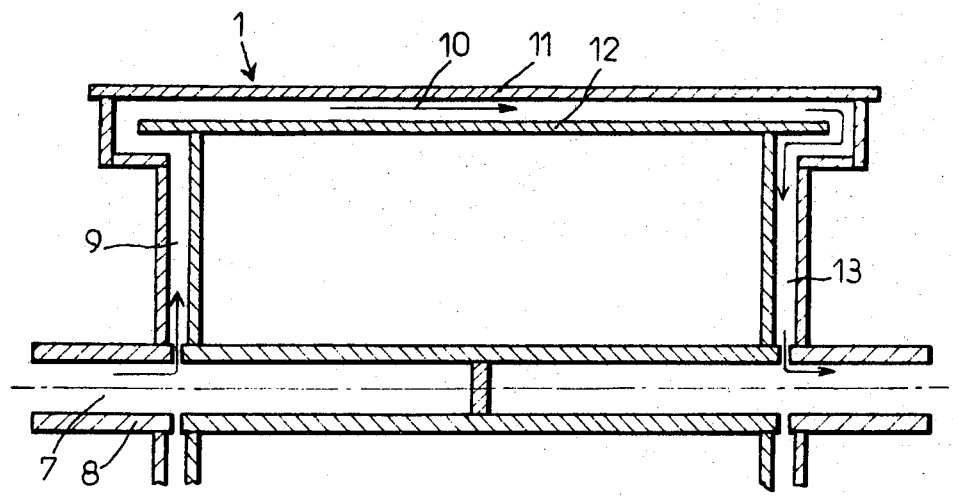
FIGS. 7 and 8 are diagrammatic sectional views illustrating methods of heating a drum of the apparatus of FIG. 1.

Alternatively, drum 1 can be heated by the circulation of pressurised heated oil. The oil, enters the drum 1 by duct 7 (see FIG. 7) inside shaft 8 of the drum 1 and flows between side plates 9 of the drum 1. It then circulates through the passageway 10 defined by the spaced sides of two concentrically mounted shells 11 and 12 forming the drum 1 and exits via duct 13 in the inside of the opposite side plates of the drum 1 into the shaft 8 of the drum 1.

Figure 8:
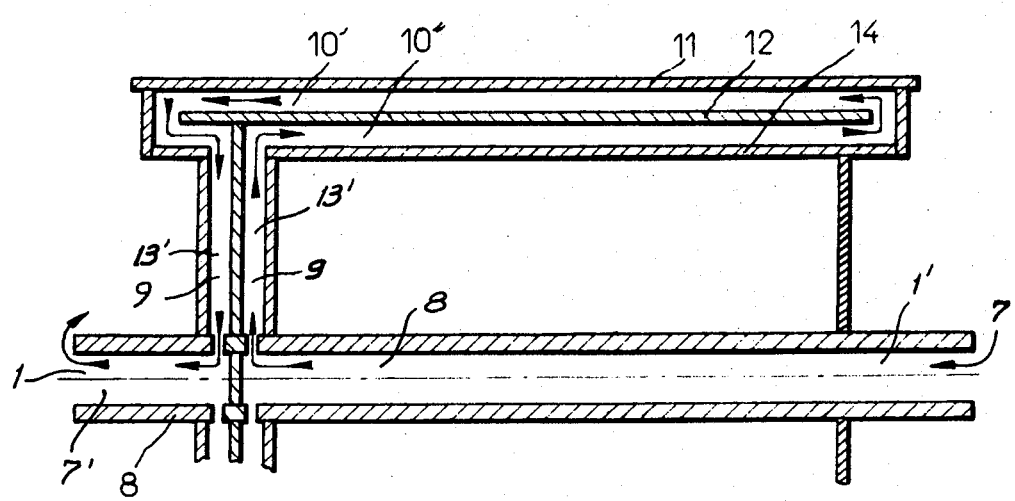

However, this method of heating drum 1 suffers from the disadvantage that, a slight difference in temperature is established between one end and the other of the drum 1. In order to minimise this disadvantage, the drum 1 is produced by the assembly of three concentric tubes 11, 12 and 14 (see FIG. 8). The heated fluid enters the shaft 8 via duct 7 and passes through duct 9 at one side of drum 1. It then passes into duct 10' defined by shells 11, 12 and flows along the width of the drum 1. The fluid then counter flows through duct 10" defined by shells 12, 14 and exits into shaft 8 via duct 13' to leave the shaft 8 at duct 7'.

By using this method of heating the drum 1, the average temperature of the fluid in the ducts 10' and 10" is always the same and the drum 1 thus has an even temperature over the whole of its width.

The major part of drum 1 is covered by an endless belt 4 which forms part of a conveyor arrangement including guide rollers 15, a driving roller 16 and an adjustable tensioning roller 17.

The rotation of driving roller 16 moves the belt 4 which by frictional engagement with drum 1, rotates drum 1.

Thus there is no risk of slipping between belt 4 and drum 1 which could mar the quality of the thermo-impression however slight it may be. Advantageously, the guide rollers 15 and the tensioning roller 17 are arranged such that any displacement of the tensioning roller 17 determines a variation in length double to the trajectory of the belt 4. To enable this displacement of tensioning roller 17 to be made, tensioning roller 17 has journals 18 which are each mounted in a movable sliding bearing (not shown). The sliding of the bearings is controlled by two jacks 19 working at each end of tensioning roller 17 but having all their movements synchronised in order to avoid any non-alignment of the bearings.

The synchronising device consists of two sets of pinions 20 and racks 21. Each of the racks 21 is integral with a bearing and engages a pinion 20. Pinions 20 are keyed onto the same shaft 22. Movement of the bearings is provided by jacks 19, enabling the pressure of the belt 4 on drum 1 to be adjustatbly varied. An adjustable reducing valve (not shown) for compressed air leads to the jacks 19 and allows this pressure to be adjusted, from 0 to 200 grams per square centimeter.

In order to regulate the setting of belt 4 on the drum 1 and on the various guide rollers 15 and tensioning roller 17, the driving roller 16 is adjustable and can take up different positions between those shown in chain dotted lines and in broken lines on FIG. 5. This displacement is operated by a screw and nut or worm wheel system (not shown), the power unit of which is operated by switch 23. Preferably, a timing device is provided in order to avoid any accidental operation. If belt 4 is excessively out of centre, switches 24 and 25 are operated which bring the whole apparatus to a halt.

In order to change the belt 4 it is necessary to dismantle the guide rollers 15 placed between the two limits of the belt and dismantle also the driving roller 16 and tensioning roller 17.

In order to facilitate dismantling, rollers 15, 16 or 17 have their journals 26 and 27 (see FIGS. 2 to 4) mounted in bearing plates 28 the dismantling of which allows a space 29 large enough to permit the rollers 15, 16 or 17 to be removed. The rollers 15, 16 or 17 are held by means of sleeves 30 and 31 which engage the journals 26 and 27 (see FIGS. 2, 3 and 4).

The apparatus includes means for feeding the basic materials 2 and 3 to be treated, for the collection of the finished product 2' and for the paper which supports the design being transferred.

The feed device for the fabric comprises an unwinding device 32 rotatable by a motor.

Fabric 2, before being brought to drum 1 passes through a compensator 39 consisting of a pulley 40 pressing against the base of a loop of fabric 2 and being displaceable vertically to take up the differences in length of the fabric between the feed device and the drum 1. These differences are related to the variation of speed between the fabric supply via the unwinding device 32 and the take-up by drum 1. The travel of this pulley 40 is limited by two stops consisting of micro-switches (not shown) which predetermine the stop or start of the unwinding device 32.

On leaving the drum 1, the printed fabric 2' runs over another compensation device 39, similar to the previously described compensator, before being made into rolls 41 by a winding device 42. This winding device is operated by a cylinder being driven by motor 33.

The special paper 3 supporting the design to be transferred is supplied by a roller 43, the journals of which are placed in slots in a rack (not shown) on which a second reserve roll 43' is mounted, enabling a continuity in the feed of paper 3 from drum 1 to be obtained. The paper 3 is stretched by means of an adjustable brake (FIG. 6).

This brake comprises a toothed friction disc 34 made integral with a framework and against the faces of which the jaws 35 and 36 are pressed by the action of a compressible element 37 adjusted by means of a nut 38.

On leaving belt 4, the paper 3' is immediately detached from drum 1 by means of an unwinding roller 44 on one side and a scraper 45. Next, it is brought up to a winding device 42'. This winding device is in the form of a cylinder driven by means of a clutch 33'. The clutch 33' (FIG. 6) comprises the toothed friction disc 34 gripped by jaws 35 and 36 one of which, at least, is integral in rotation with the cylinder to be driven. The friction couple thus produced is able to be adjusted by turning the nut 38 altering the action of the intermediate compressible element 37.

Further, the feed for the fabric to be printed, can include an unwinding device for edging 46, by an edging guide 47 and similarly by a wiping bar 48. Wiping bar 48 can be made either in the form of a simple square bar, or, in the form of a bar having opposite threads at each end.

It is understood that the invention is not limited by the embodiment described and illustrated, from which other forms and other embodiments can be foreseen, without departing from the spirit and scope of the claims.

What is claimed is:

1. In an apparatus for the heat treatment of sheet and fibrous material comprising a rotatable cylindrical drum heatable to a predetermined temperature and means for rotating the drum, the improvement which comprises an endless belt for applying the material to be heat treated to the cylindrical surface of the drum, said belt encompassing the major part of the drum and having a linear velocity which is substantially equal to the angular velocity of the cylindrical surface of the drum, and a conveyor arrangement over which said endless belt passes, the conveyor arrangement comprising guiding rollers, and adjustable tensioning roller and a driving roller, movable sliding bearings for supporting the tensioning roller, jacks for engaging and moving the sliding bearings to adjust the position of the tensioning roller and a synchronising device to ensure correct alignment of the sliding bearings.

2. An apparatus as claimed in claim 1, wherein the synchronising device comprises two racks, each rack being integral with a sliding bearing, and two pinions each keyed to a shaft and each engaging a rack.

3. An apparatus as claimed in claim 1, wherein the guiding rollers, tensioning roller and the driving roller each have journals mounted in bearing plates, the bearing plates being dismantleable to permit the removal of the rollers.

4. An apparatus as claimed in claim 1, wherein the driving roller is adjustable between two positions each inclined to the rotational axis of the drum and extending on either side of a plane parallel with the axis of rotation of the drum.

5. In an apparatus for performing a thermo-impression process comprising a rotatable drum on which paper carrying a design and fabric on to which the design is to be transposed, are heated and means for rotating the drum, the improvement which comprises:

(a) an endless belt for applying the paper and fabric to be heated to the surface of the drum, said belt having a linear velocity which is substantially equal to the angular velocity of the surface of the drum, the endless belt encompassing the major part of the surface of the drum;

(b) means for feeding the fabric to be heated onto the endless belt;

(c) motor means for driving said feed means;

(d) a first compensator device for controlling the rate of feed of the fabric to be heated, the first compensator controlling the operation of said motor means;

(e) means for collecting the fabric after the heat treatment from the the endless belt;

(f) a second compensator device for controlling the rate at which the collecting means collects the fabric after the heat treament;

(g) means for feeding the paper to be heated onto the endless belt; and (h) a scraper and a roller for detaching the paper after the heat treatment from the drum.

6. In an apparatus for the heat treatment of sheet and fibrous material comprising a rotatable cylindrical drum heatable to a predetermined temperature and means for rotating the drum, the improvement which comprises an endless belt for applying the material to be heat treated to the cylindrical surface of the drum, said belt encompassing the major part of the drum and having a linear velocity which is substantially equal to the angular velocity of the cylindrical surface of the drum, said drum comprising three concentric spaced shells, the spaces between the shells forming passageways for heating fluid, the fluid being constrained to flow in the space between two shells in one sense and in the space between two different shells in the opposite sense.

References Cited

UNITED STATES PATENTS

| | | | |
|---|---|---|---|
| 2,631,958 | 3/1953 | Francis | 156—238 |
| 2,593,553 | 4/1952 | Francis | 156—540 |
| 2,877,012 | 3/1959 | Angel et al. | 242—75.44 X |
| 3,235,197 | 2/1966 | Johnson et al. | 242—75.44 X |
| 2,859,537 | 11/1958 | Shockey. | |

BENJAMIN A. BORCHELT, Primary Examiner

J. M. HANLEY, Assistant Examiner

U.S. Cl. X.R.

156—238